United States Patent
Army et al.

(10) Patent No.: US 10,934,006 B2
(45) Date of Patent: Mar. 2, 2021

(54) AIR CYCLE MACHINE MODULE AIR GATE SEAL FOR ENVIRONMENTAL CONTROL SYSTEMS

(71) Applicant: Hamilton Sundstrand Corporation, Charlotte, NC (US)

(72) Inventors: Donald E. Army, Enfield, CT (US); Frederick Peacos, III, North Scituate, RI (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/438,613

(22) Filed: Jun. 12, 2019

(65) Prior Publication Data

US 2019/0291874 A1 Sep. 26, 2019

Related U.S. Application Data

(62) Division of application No. 15/376,157, filed on Dec. 12, 2016, now Pat. No. 10,358,222.

(51) Int. Cl.
  *F16K 11/076* (2006.01)
  *B64D 13/06* (2006.01)
  (Continued)

(52) U.S. Cl.
  CPC ............ *B64D 13/06* (2013.01); *F16K 5/0478* (2013.01); *F16K 11/02* (2013.01); *F16K 11/076* (2013.01);
  (Continued)

(58) Field of Classification Search
  USPC ........ 137/625.44, 625.46; 251/177, 179–181
  See application file for complete search history.

(56) References Cited

U.S. PATENT DOCUMENTS

| 1,597,456 A | ‡ | 8/1926 | Minard | F16K 5/0478 |
| | | | | 251/175 |
| 2,516,425 A | ‡ | 7/1950 | Saver | F16K 5/184 |
| | | | | 137/625.11 |

(Continued)

FOREIGN PATENT DOCUMENTS

| DE | 102006032584 A1 | ‡ | 1/2008 | .............. F01L 7/022 |
| DE | 102006032584 A1 | | 1/2008 | |

(Continued)

OTHER PUBLICATIONS

US 6,459,305 B1, 06/2013, Sutliff et al. (withdrawn)
Extended European Search Report for Application No. 17206686.2; Report Issued dated Mar. 2, 2018; 1-7 pages U310860EP.‡

*Primary Examiner* — John Fox
(74) *Attorney, Agent, or Firm* — Cantor Colburn LLP

(57) ABSTRACT

An isolation valve comprising: a housing having an internal surface within the housing, the internal surface having a first outlet and second outlet; an air gate having an outward face opposite the internal surface, the air gate located within the housing and configured to move to at least one of a first position blocking flow to the first outlet, a neutral position blocking flow to neither the first outlet nor second outlet, and a second position blocking flow to the second outlet; a seal groove located on the outward face of the air gate; a seal located within seal groove, the seal configured to form a sealed connection with the internal surface around at least one of the first outlet when in the first position and the second outlet when in the second position; and a retainer configured to secure the seal within the seal groove using a fastening mechanism.

8 Claims, 15 Drawing Sheets

(51) Int. Cl.
*F16K 5/04* (2006.01)
*F16K 11/02* (2006.01)

(52) U.S. Cl.
CPC ............... *B64D 2013/064* (2013.01); *B64D 2013/0618* (2013.01); *B64D 2013/0688* (2013.01)

(56) References Cited

U.S. PATENT DOCUMENTS

| | | | | |
|---|---|---|---|---|
| 3,155,368 A ‡ | 11/1964 | Shafer | ................... | F16K 5/0684 137/24 |
| 3,269,692 A ‡ | 8/1966 | Shafer | ................... | F16K 5/0673 251/172 |
| 3,284,046 A ‡ | 11/1966 | Allenbaugh, Jr. | .... | F16K 5/0684 251/315.08 |
| 3,532,320 A ‡ | 10/1970 | Fisch | ................... | F16K 5/0647 137/329.02 |
| 3,678,556 A ‡ | 7/1972 | Shafer | ................... | F16K 5/0684 251/163 |
| 4,436,283 A ‡ | 3/1984 | Shore | ................... | F16K 3/20 251/17 |
| 4,570,670 A ‡ | 2/1986 | Johnson | ................... | F16K 3/20 137/55 |
| 4,634,098 A ‡ | 1/1987 | Varden | ................... | F16K 1/24 137/559 |
| 5,120,021 A ‡ | 6/1992 | Squirrell | ................... | F16K 1/16 137/625.44 |
| 5,186,205 A ‡ | 2/1993 | Bachmann | ................ | F16K 1/16 137/242 |
| 5,413,140 A ‡ | 5/1995 | Kimpel | ................ | F16K 3/0227 137/37 |
| 5,461,882 A * | 10/1995 | Zywiak | ............. | B60H 1/00007 62/401 |
| 5,704,218 A * | 1/1998 | Christians | .............. | B64D 13/06 62/172 |
| 6,053,505 A ‡ | 4/2000 | Starke | .................. | F16J 15/0893 277/551 |
| 8,459,305 B2 ‡ | 6/2013 | Sutliff | .................. | F16K 1/2007 138/44 |
| 8,479,771 B2 ‡ | 7/2013 | Campbell | ............ | F16K 11/0853 137/625 |
| 9,669,936 B1 | 6/2017 | Fiterman et al. | | |
| 2006/0027779 A1‡ | 2/2006 | McGuire | ............... | F16K 5/0407 251/30 |
| 2011/0089357 A1‡ | 4/2011 | Tan | ..................... | F16K 11/0853 251/285 |

FOREIGN PATENT DOCUMENTS

| | | | | |
|---|---|---|---|---|
| EP | 1464575 A1 ‡ | 10/2004 | ............. | B64D 13/06 |
| EP | 1464575 A1 | 10/2004 | | |
| FR | 2920853 A1 ‡ | 3/2009 | .......... | F02B 29/0418 |
| FR | 2920853 A1 | 3/2009 | | |
| FR | 2937394 A1 ‡ | 4/2010 | .......... | F16K 5/0407 |
| FR | 2937394 A1 | 4/2010 | | |
| GB | 728351 A ‡ | 4/1955 | .......... | F16K 5/0478 |
| GB | 728351 A | 4/1955 | | |

\* cited by examiner
‡ imported from a related application

AIR CYCLE MACHINE MODULE AIR GATE SEAL FOR ENVIRONMENTAL CONTROL SYSTEMS

CROSS-REFERENCE TO RELATED APPLICATIONS

This application claims the benefit of U.S. Non Provisional application Ser. No. 15/376,157 filed Dec. 12, 2016, which is incorporated herein by reference in its entirety.

BACKGROUND

The subject matter disclosed herein generally relates to environmental control systems and, more particularly, to air cycle machines of environmental control systems.

Commercial aircraft are conventionally equipped with two-pack environmental control system architectures that include redundant packs installed in separate bays beneath a center wing box of the aircraft and are encapsulated by the aircraft wing-to-body fairing. Smaller configurations of environmental control system architectures can include pack-and-a-half architectures that fit within a single volume. Two-pack as well as pack-and-a-half architectures commonly coordinate air flow to one or more compressors. A valve to efficiently coordinate air flow to one or more compressors is desired.

SUMMARY

According to one embodiment, an isolation valve is provided. The isolation valve comprising: a housing having an internal surface within the housing, the internal surface having a first outlet and a second outlet; an air gate having an outward face opposite the internal surface, the air gate being located within the housing and configured to move to at least one of a first position blocking flow to the first outlet, a neutral position blocking flow to neither the first outlet nor the second outlet, and a second position blocking flow to the second outlet; a seal groove located on the outward face of the air gate; a seal located within the seal groove, the seal being configured to form a sealed connection with the internal surface around at least one of the first outlet when in the first position and the second outlet when in the second position; and a retainer configured to secure the seal within the seal groove using a fastening mechanism.

In addition to one or more of the features described above, or as an alternative, further embodiments of the isolation valve may include an actuator configured to selectively move the air gate to at least one of the first position, the neutral position, and the second position.

In addition to one or more of the features described above, or as an alternative, further embodiments of the isolation valve may include that the seal is configured to conform to a shape of the housing internal surface and apply sealing pressure to the housing internal surface to form the sealed connection with the internal surface.

In addition to one or more of the features described above, or as an alternative, further embodiments of the isolation valve may include a biasing device configured to apply a force to the seal that allows the seal to conform to a shape of the housing internal surface and apply a sealing pressure to the housing internal surface to form the sealed connection with the internal surface.

In addition to one or more of the features described above, or as an alternative, further embodiments of the isolation valve may include that the seal is configured to slide along the internal surface when the air gate is moved.

In addition to one or more of the features described above, or as an alternative, further embodiments of the isolation valve may include that the seal groove is an outbound groove including a first groove wall radially inward from the seal.

In addition to one or more of the features described above, or as an alternative, further embodiments of the isolation valve may include the seal groove is an inbound groove including a first groove wall radially inward from the seal and a second groove wall radially outward from the seal.

In addition to one or more of the features described above, or as an alternative, further embodiments of the isolation valve may include that the fastening mechanism further comprises: a plurality of screws securing the retainer to the air gate, wherein the seal is interposed between the retainer and the outward face of the air gate.

According to another embodiment, a tandem air cycle machine module is provided. The tandem air cycle machine comprising: a first air cycle machine having a first compressor and a first turbine; a second air cycle machine having a second compressor and a second turbine; an isolation valve comprising: a housing operably connected to both the first air cycle machine through a first inlet in the housing and the second air cycle machine through a second inlet in the housing, the housing having an internal surface; an air gate having an outward face opposite the internal surface, the air gate being located within the housing and configured to move to at least one of a first position blocking flow to the first outlet, a neutral position blocking flow to neither the first outlet nor the second outlet, and a second position blocking flow to the second outlet; a seal groove located on the outward face of the air gate; a seal located within the seal groove, the seal being configured to form a sealed connection with the internal surface around at least one of the first outlet when in the first position and the second outlet when in the second position; and a retainer configured to secure the seal within the seal groove using a fastening mechanism.

In addition to one or more of the features described above, or as an alternative, further embodiments of the tandem air cycle machine may include an actuator configured to selectively move the air gate to at least one of the first position, the neutral position, and the second position.

In addition to one or more of the features described above, or as an alternative, further embodiments of the tandem air cycle machine may include that the seal is configured to conform to a shape of the housing internal surface and apply sealing pressure to the housing internal surface to form the sealed connection with the internal surface.

In addition to one or more of the features described above, or as an alternative, further embodiments of the tandem air cycle machine may include that the isolation valve further comprises: a biasing device configured to apply a force to the seal that allows the seal to conform to a shape of the housing internal surface and apply a sealing pressure to the housing internal surface to form the sealed connection with the internal surface.

In addition to one or more of the features described above, or as an alternative, further embodiments of the tandem air cycle machine may include that the seal is configured to slide along the internal surface when the air gate is moved.

In addition to one or more of the features described above, or as an alternative, further embodiments of the tandem air cycle machine may include that the seal groove is an outbound groove including a first groove wall radially inward from the seal.

In addition to one or more of the features described above, or as an alternative, further embodiments of the tandem air cycle machine may include that the seal groove is an inbound groove including a first groove wall radially inward from the seal and a second groove wall radially outward from the seal.

In addition to one or more of the features described above, or as an alternative, further embodiments of the tandem air cycle machine may include that the fastening mechanism further comprises: a plurality of screws securing the retainer to the air gate, wherein the seal is interposed between the retainer and the outward face of the air gate.

According to another embodiment, a method of assembling an isolation valve is provided. The method comprising: obtaining an air gate having an outward face and a seal groove located on the outward face; inserting a seal within the seal groove; securing the seal within the seal groove using a retainer and a fastening mechanism; and installing the air gate into a housing, the housing having an internal surface within the housing, a first outlet in the internal surface and a second outlet in the internal surface; wherein the outward face being opposite the internal surface; wherein the air gate is configured to move to at least one of a first position blocking flow to the first outlet, a neutral position blocking flow to neither the first outlet nor the second outlet, and a second position blocking flow to the second outlet; wherein the seal is configured to form a sealed connection with the internal surface around at least one of the first outlet when in the first position and the second outlet when in the second position.

In addition to one or more of the features described above, or as an alternative, further embodiments of the method may include operably connecting an actuator to the air gate, the actuator being configured to selectively move the air gate to at least one of the first position, the neutral position, and the second position.

In addition to one or more of the features described above, or as an alternative, further embodiments of the method may include that the seal is configured to conform to a shape of the housing internal surface and apply sealing pressure to the housing internal surface to form the sealed connection with the internal surface.

In addition to one or more of the features described above, or as an alternative, further embodiments of the method may include inserting a biasing device interposed between the seal and the seal groove, the biasing device being configured to apply a force to the seal that allows the seal to conform to a shape of the housing internal surface and apply a sealing pressure to the housing internal surface to form the sealed connection with the internal surface.

Technical effects of embodiments of the present disclosure include a sealing assembly configured to seal the outlets of an isolation valve in an environmental control system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

Figure 10:
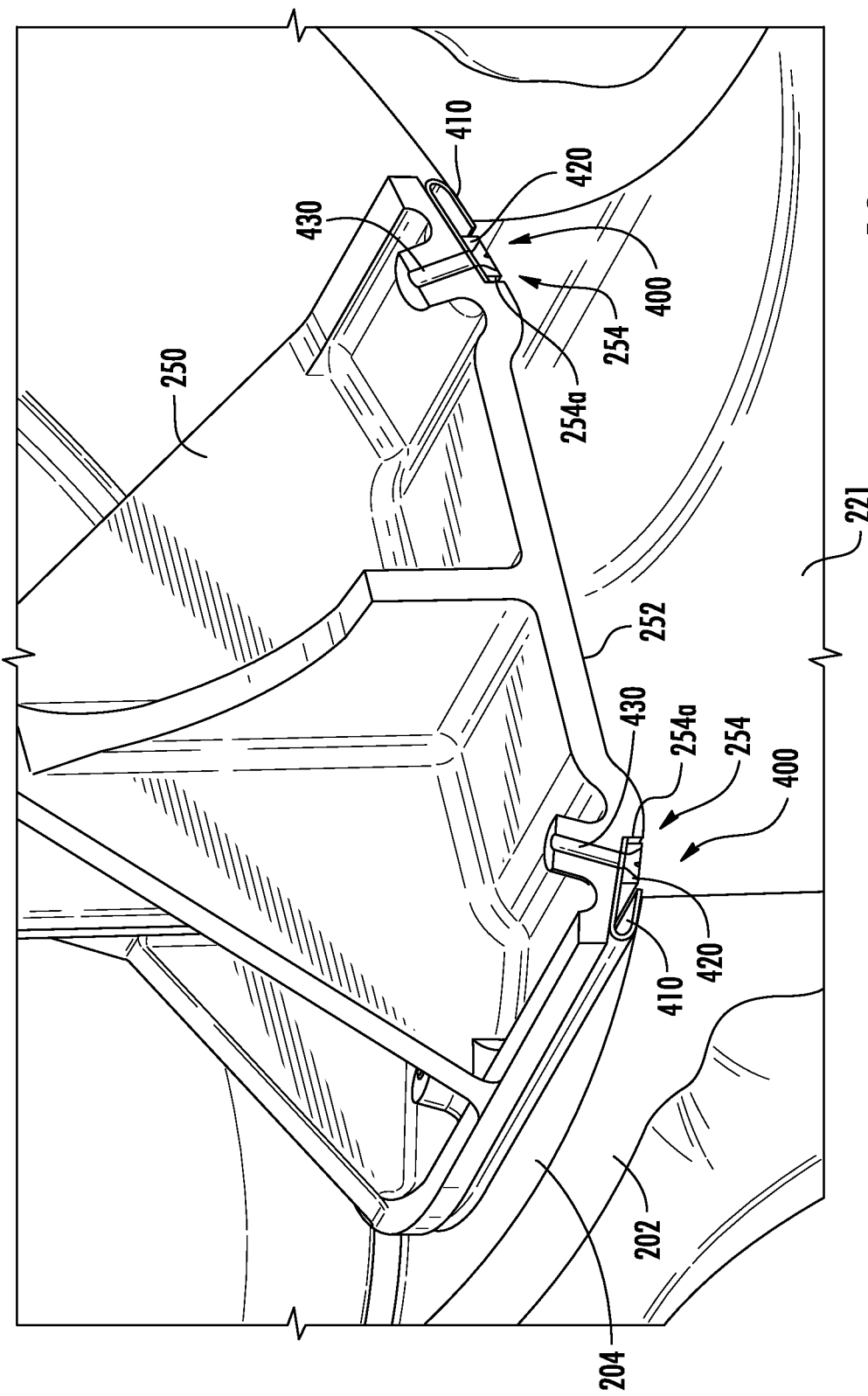
FIG. 10 is a schematic, cross-sectional illustration of an isolation valve incorporating the seal assembly and air gate of FIG. 6, where the seal assembly and air gate is blocking flow to a first outlet of the isolation valve housing, according to an embodiment of the present disclosure.
Figure 11:
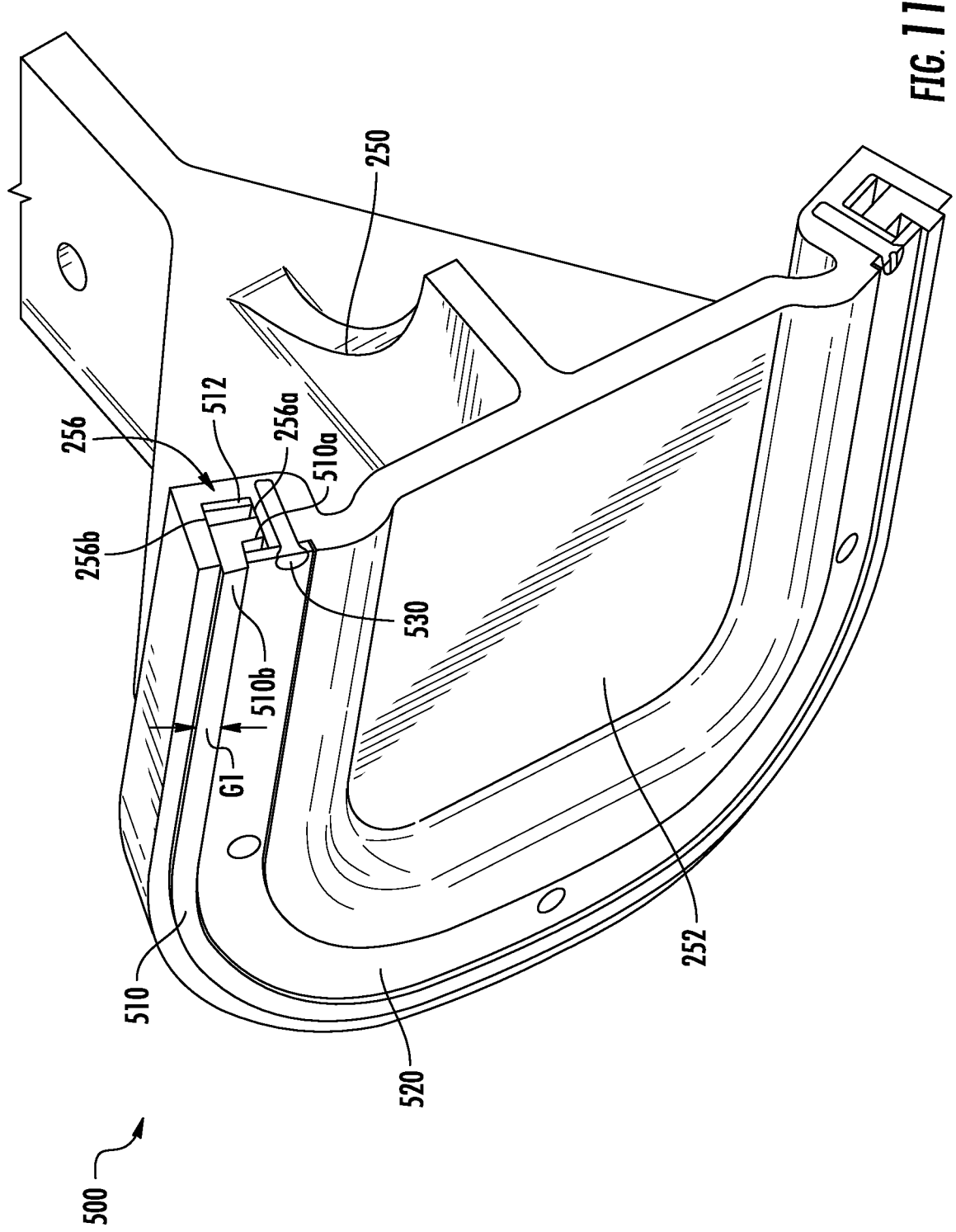
FIG. 11 is a schematic, perspective illustration of a seal assembly on an air gate within an isolation valve, according to an embodiment of the present disclosure.
Figure 12:
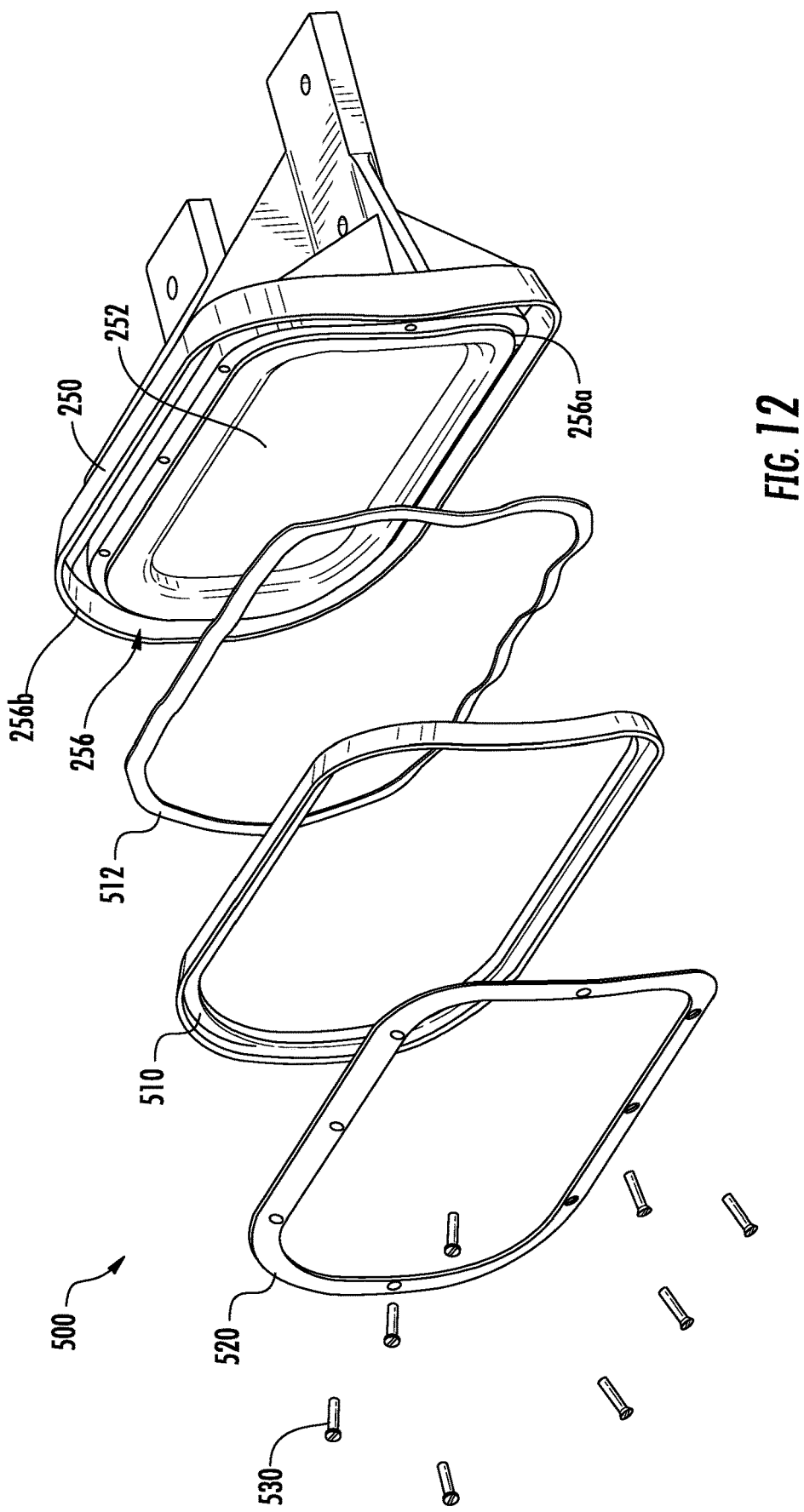
FIG. 12 is an exploded view of the seal assembly and air gate of FIG. 11, according to an embodiment of the present disclosure.
Figure 14:
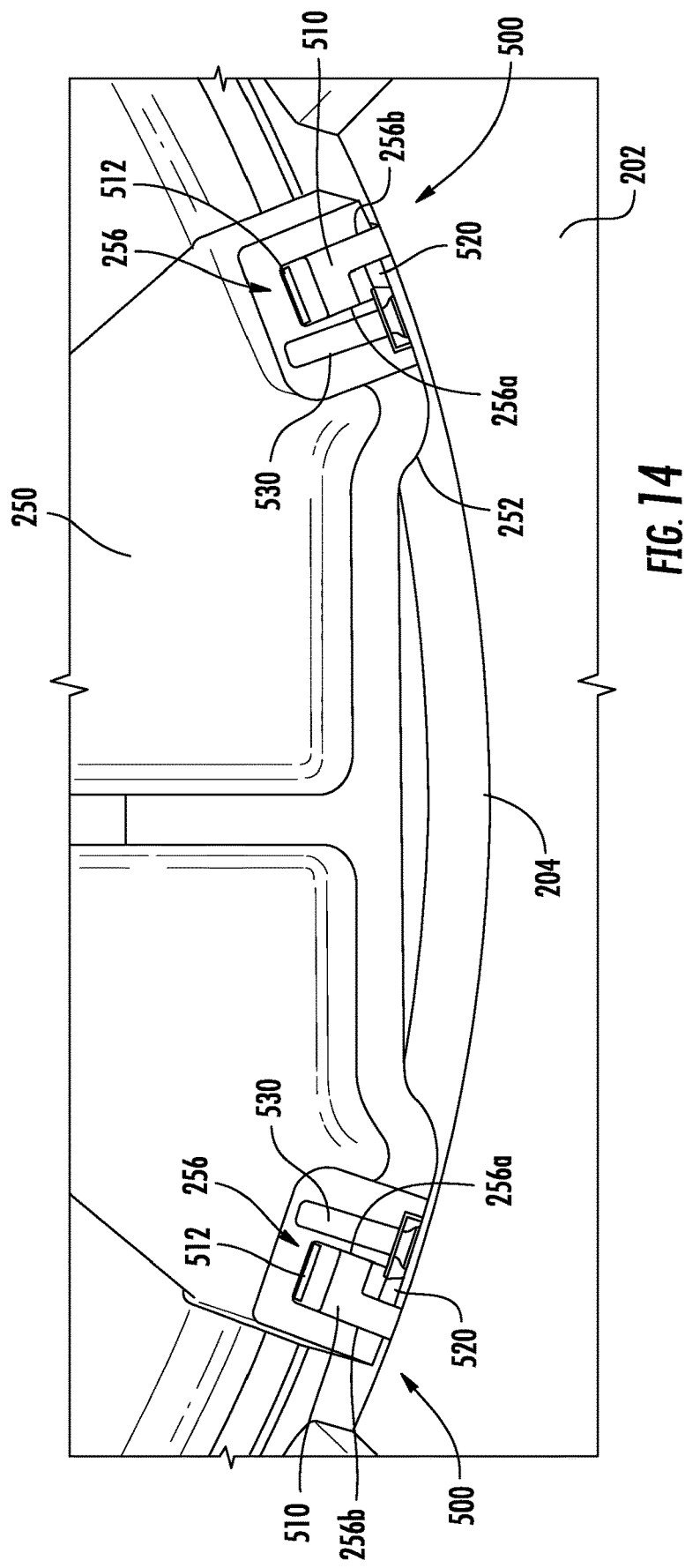
FIG. 14 is an enlarged view of FIG. 13, according to an embodiment of the present disclosure.
Figure 15:
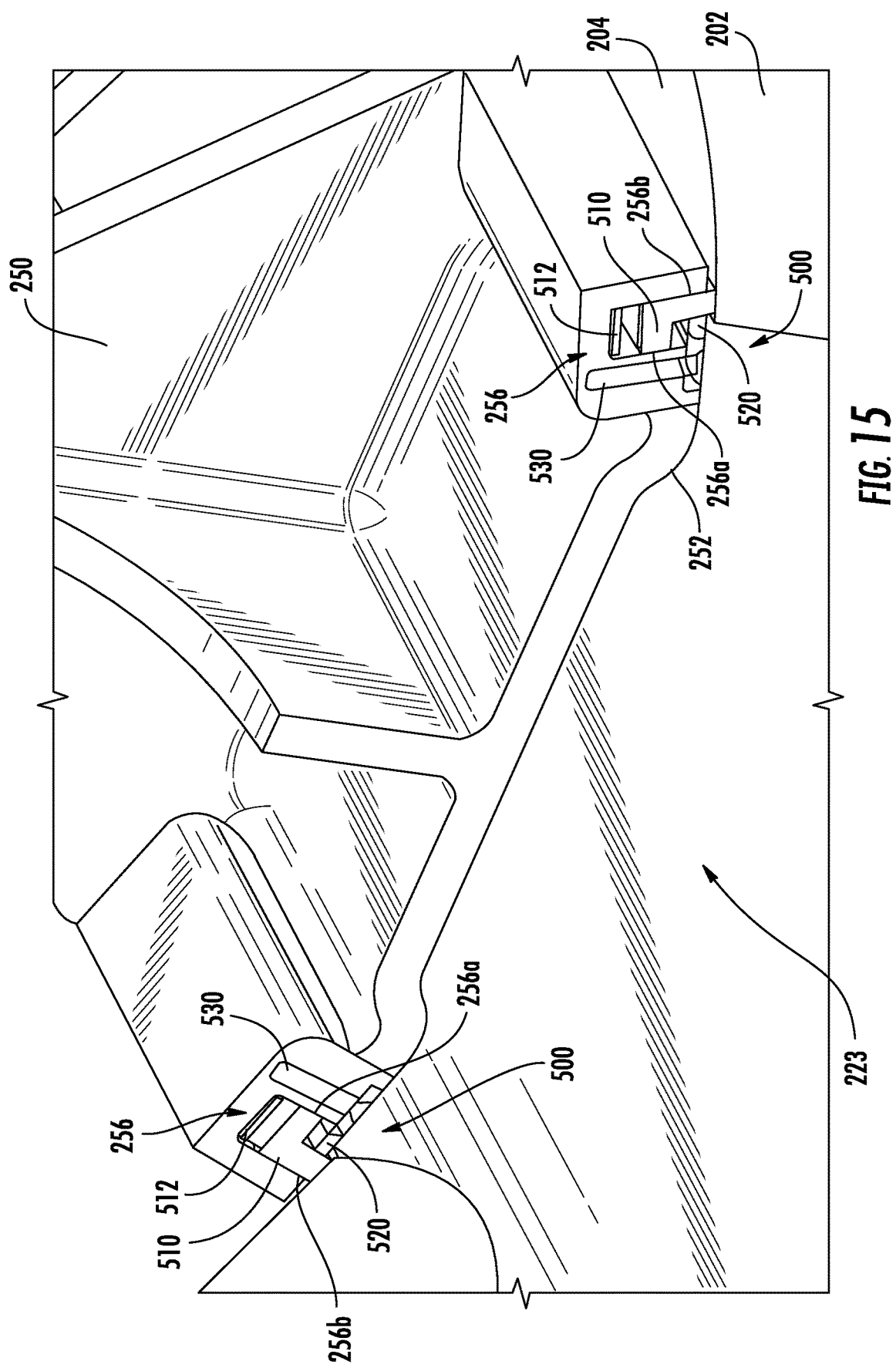
Figure 16:
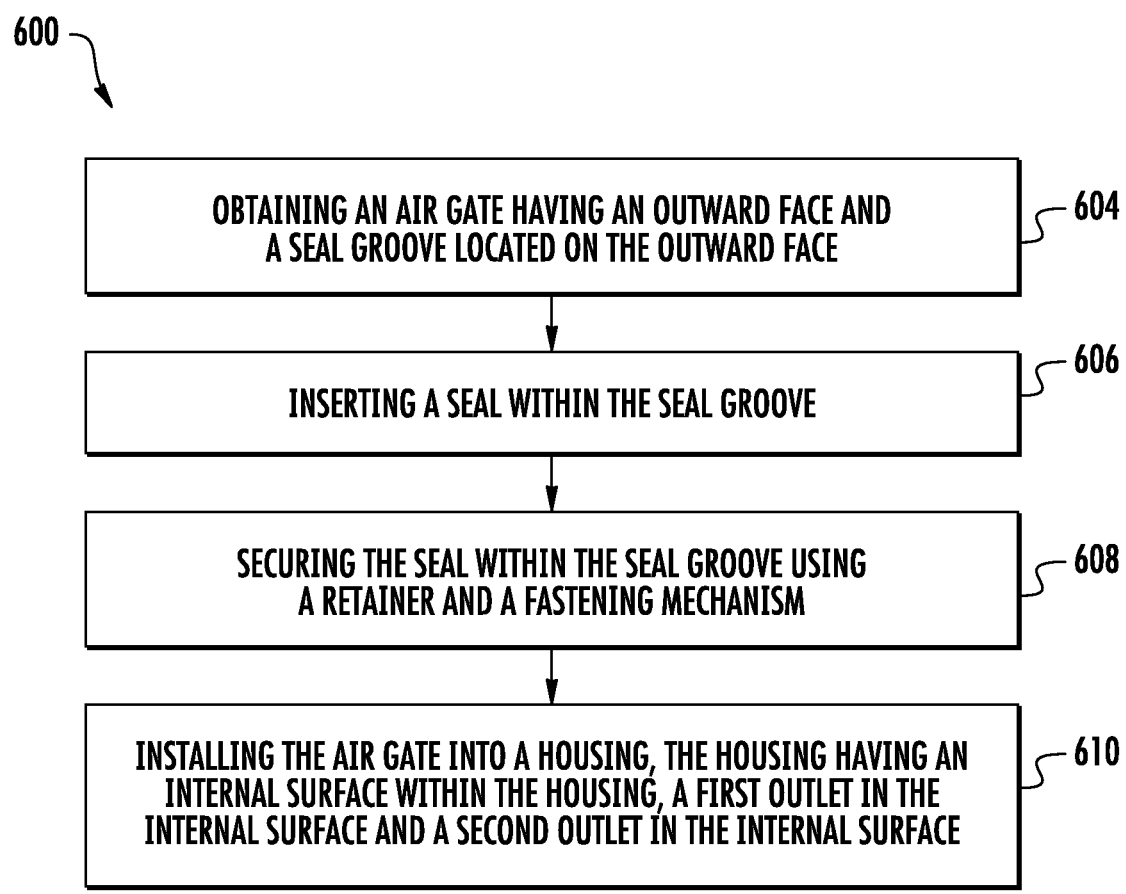

FIG. 15 is a schematic, cross-sectional illustration of an isolation valve incorporating the seal assembly and air gate of FIG. 11, where the seal assembly and air gate is blocking flow to a second outlet of the isolation valve housing, according to an embodiment of the present disclosure; and FIG. 16 is a flow process illustrating a method of assembling the isolation valve of FIGS. 3-15, according to an embodiment of the present disclosure.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
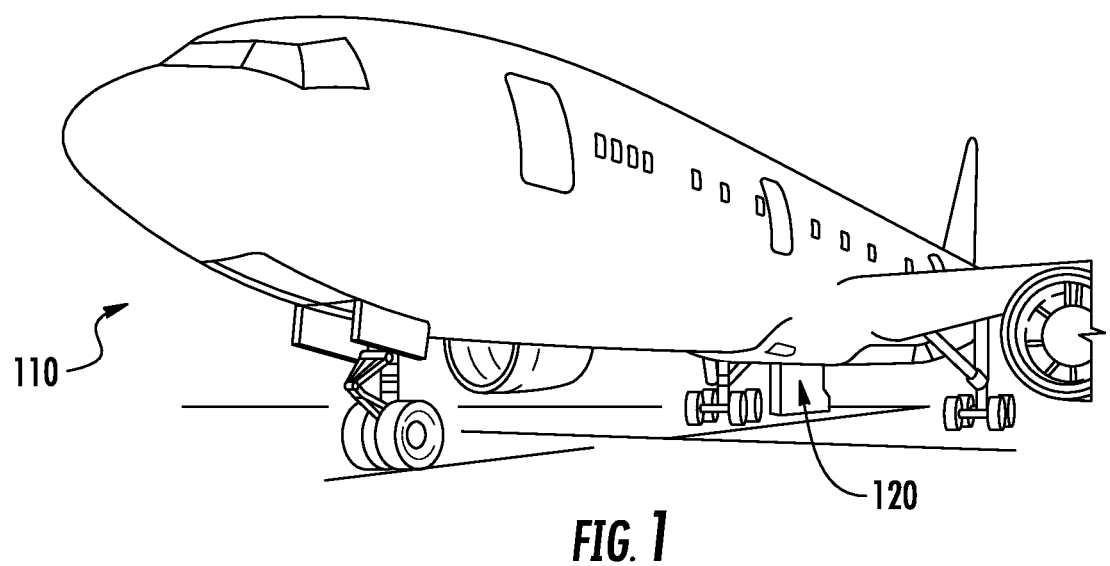
FIG. 1 is a schematic diagram of an aircraft that may incorporate various embodiments of the present disclosure.
Figure 2:
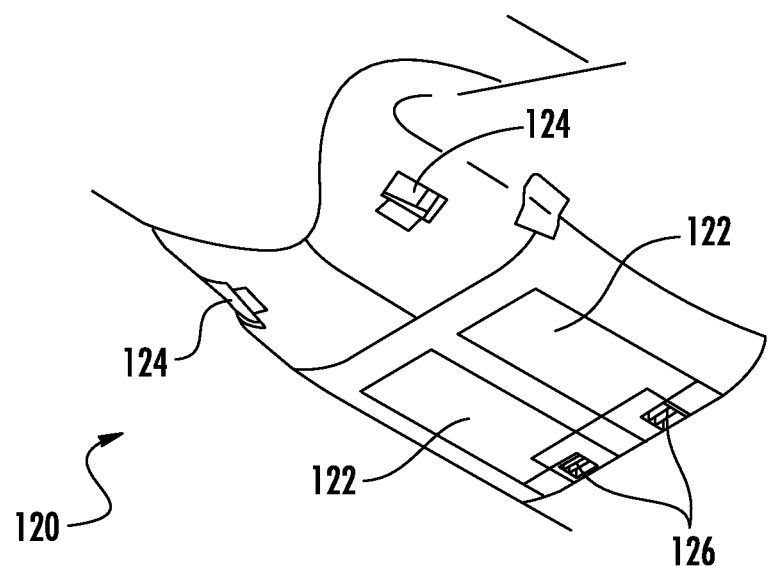
FIG. 2 is a schematic illustration of a bay section of the aircraft of FIG. 1.

As shown in FIGS. 1-2, an aircraft 110 can include one or more bays 120 beneath a center wing box. The bay 120 can contain and/or support one or more components of the aircraft 110. For example, in some configurations, the aircraft 110 can include environmental control systems within the bay 120. As shown in FIG. 2, the bay 120 includes bay doors 122 that enable installation and access to one or more components (e.g., environmental control systems). During operation of environmental control systems, air that is external to the aircraft 110 can flow into one or more environmental control systems within the bay doors 122 through one or more ram air inlets 124. The air may then flow through the environmental control systems to be processed and supplied to various components or locations within the aircraft 110 (e.g., passenger cabin, etc.). Some air may be exhaust through one or more ram air exhaust outlets 126.

Figure 3:
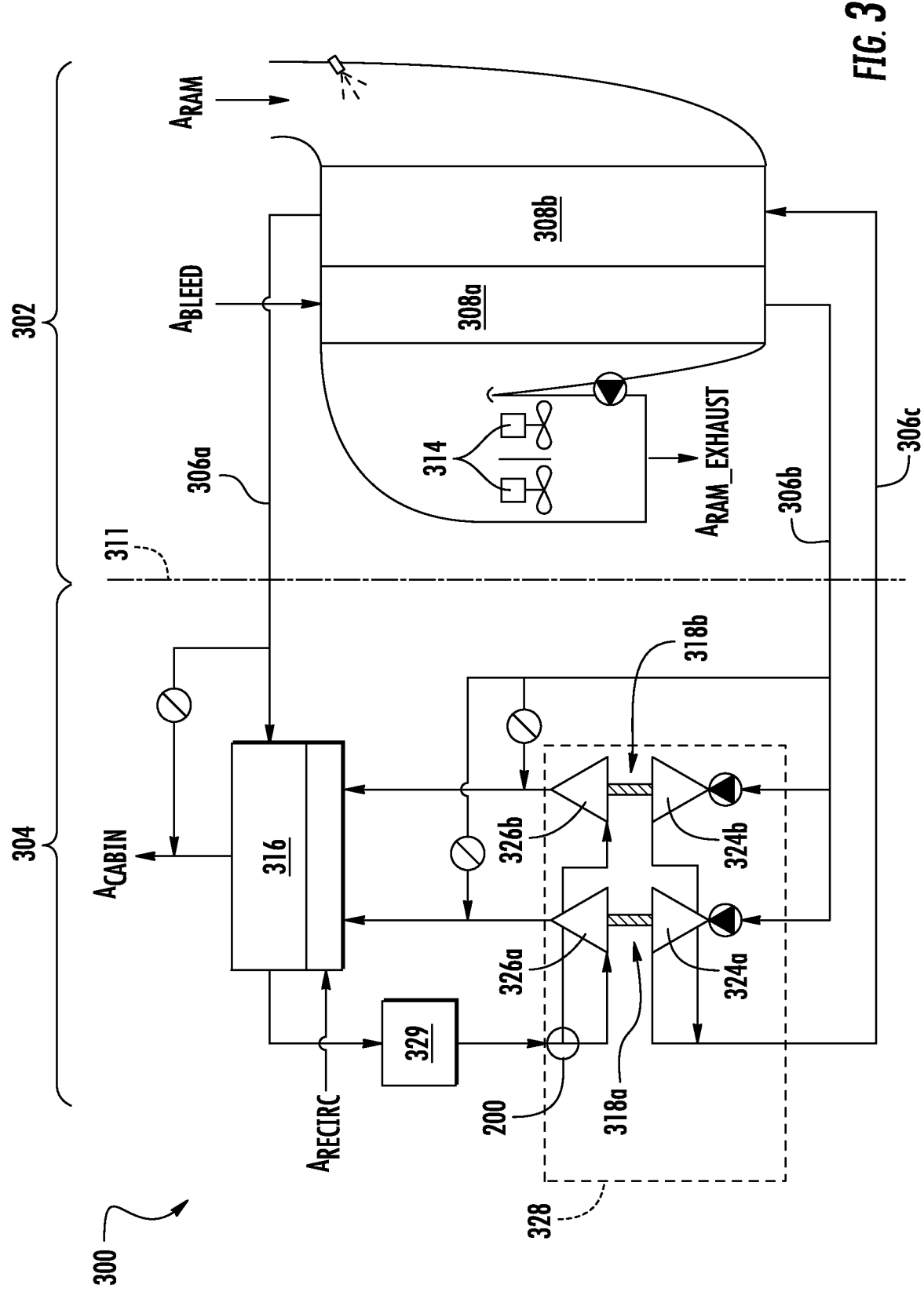
FIG. 3 is a schematic diagram of an environmental control system in accordance with an embodiment of the present disclosure.

For example, turning now to FIG. 3, a schematic diagram of an environmental control system 300 in accordance with an embodiment of the present disclosure is shown. The environmental control system 300 of FIG. 3 is merely for illustrative and explanatory purposes, and those of skill in the art will appreciate that various embodiments of the present disclosure can be configured with different types of environmental control systems and/or different configurations of environmental control systems, and thus, the present discussion and associated illustrations are not intended to be limiting.

The environmental control system 300 includes a ram module 302 and a refrigeration module 304. In some configurations, when installed on an aircraft, the ram module 302 can be installed into a right-hand side of the aircraft, and thus through a first bay door and the refrigeration module 304 can be installed into a left-hand side of the aircraft, and through a second bay door. In FIG. 3, an aircraft centerline 311 is indicated as separating the ram module 302 from the refrigeration module 304.

The ram module 302 is operably connected to the refrigeration module 304 by one or more ducts 306a, 306b, 306c. As shown in FIG. 3, the environmental control system 300 includes a primary heat exchanger 308a and a secondary heat exchanger 308b that are configured to receive bleed air $A_{bleed}$ and ram air $A_{ram}$, respectively, to condition air within the ram module 302. One or more ram fans 314 are configured to aid in exhausting ram exhaust air $A_{ram\_exhaust}$ from the ram module 302.

As shown, the refrigeration module 304 includes a condenser heat exchanger 316 and tandem air cycle machines 318a, 318b. The condenser heat exchanger 316 is configured to condition air and supply relatively cool or cold air $A_{cabin}$ to a cabin of an aircraft. The condenser heat exchanger 316 can be operably connected to the secondary heat exchanger 308b by a first duct 306a that can supply hot air to the condenser heat exchanger 316. The air cycle machines 318a, 318b can be connected to one or both of the heat exchangers 308a, 308b, as shown. Recirculated air $A_{recirc}$ can be supplied to and mixed with turbine outlet air from the air cycle machines 318a, 318b as indicated in FIG. 3.

Each of the tandem air cycle machines 318a, 318b includes a respective compressor 324a, 324b and a respective turbine 326a, 326b. The tandem air cycle machines 318a, 318b can form a tandem air cycle machine module 328, as indicated by the dashed-line box in FIG. 3. The tandem air cycle machine module 328 can include two air cycle machines (e.g., 318a, 318b) that are operably connected to a centralized manifold, as described herein, and thus form a compact, unitized assembly. Although shown and described herein with two air cycle machines 318a, 318b, those of skill in the art will appreciate that embodiments of the present disclosure can be applied to two, three, or four wheel tandem air cycle machines. As shown, a water collector 329 is configured to extract moisture from air of the condenser 316 and supply the conditioned air to the air cycle machines 318a, 318b. An air cycle machine isolation valve 200 is schematically shown that is configured to be operated and control fluid flow into one or both of the air cycle machines 318a, 318b.

As shown in FIG. 3, the ram fans 314 and the air cycle machines 318 are separated. Such a configuration enables the separation of the environmental control system 300 to be separated into the ram module 302 and the refrigeration module 304. As shown, the ram module 302 includes the ram fans 314. In some embodiments, the ram fans 314 can be configured as dual electric ram fans that can provide a required ram cooling performance and redundancy. The ram fans 314 can be operated separately or at the same time to enable control and variance in ram flow. Fixed speed fans, two speed fans, or variable speed fans can be used without departing from the scope of the present disclosure. Accordingly, the environmental control system 300 can be installed into two separate volumes on an aircraft (e.g., in two separate bays) as compared to a single large volume.

Figure 4:
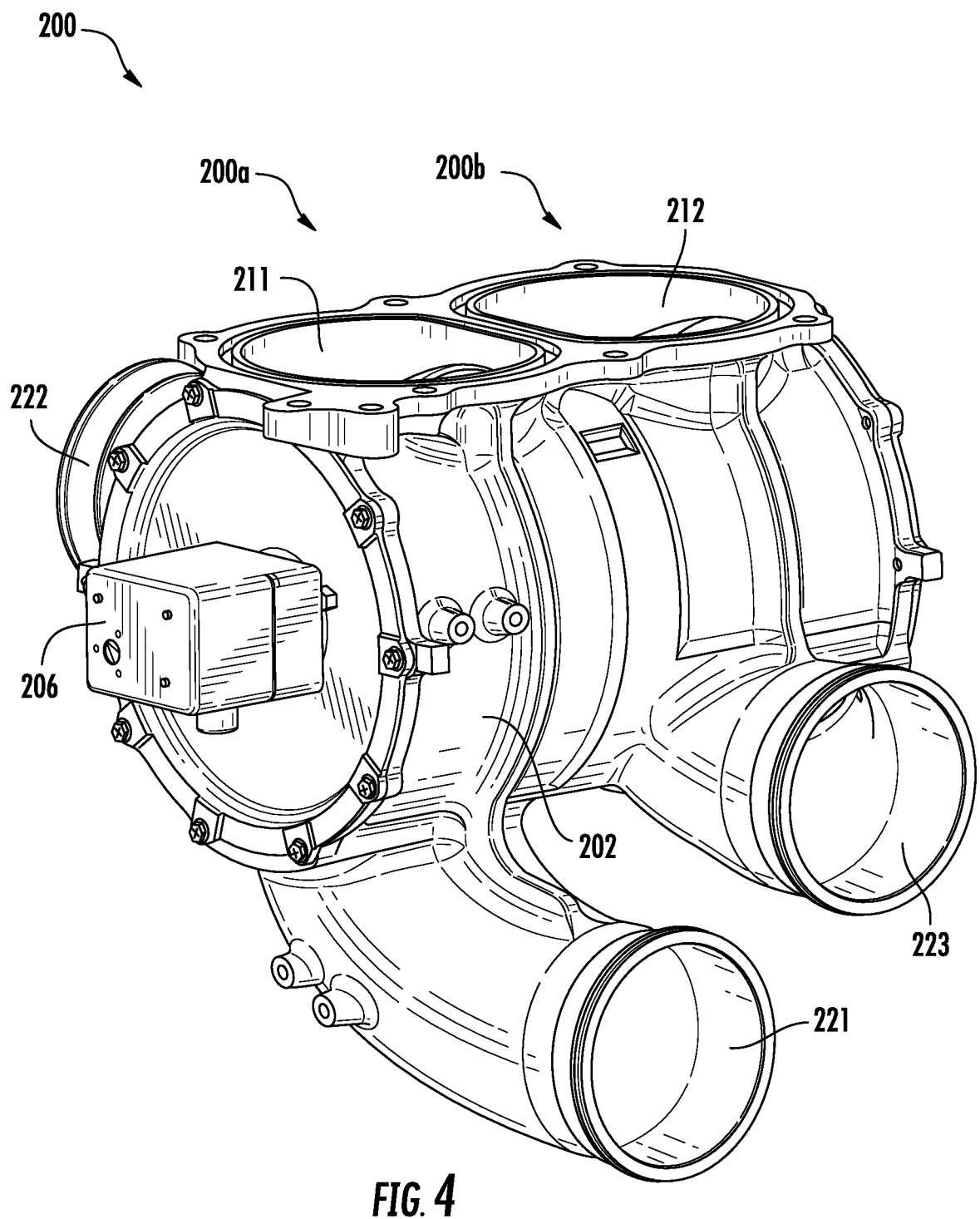
FIG. 4 is a schematic, perspective illustration of an isolation valve, according to an embodiment of the present disclosure.
Figure 5:
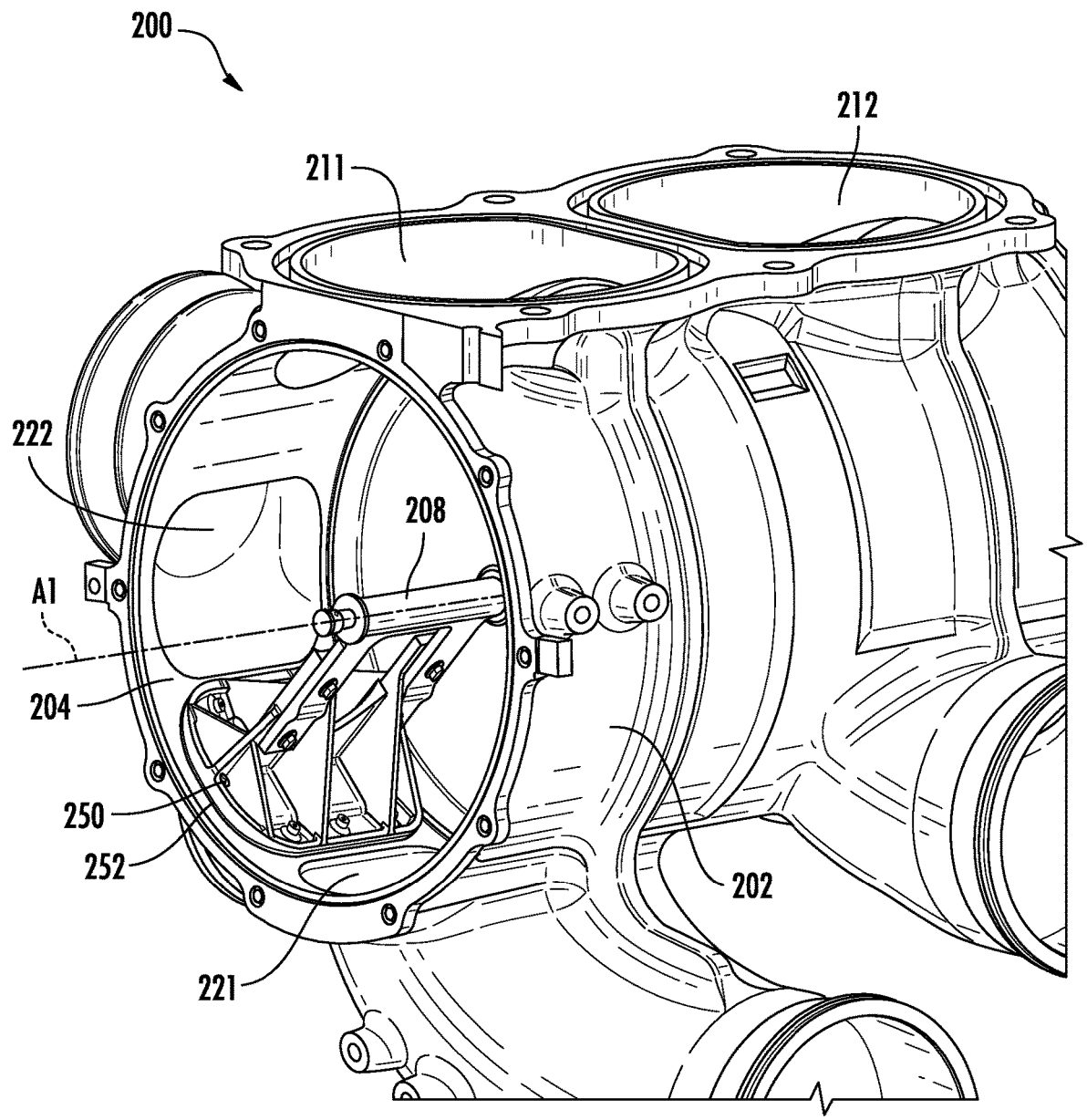
FIG. 5 is a schematic, perspective illustration of the interior of the isolation valve of FIG. 4, according to an embodiment of the present disclosure.

Turning now to FIGS. 4-5, schematic illustrations of the air cycle machine isolation valve 200 in accordance with an embodiment of the present disclosure are shown. The isolation valve 200 is configured to be operated and control fluid flow into two or more air cycle machines. The isolation valve 200 illustrated in FIGS. 4-5 (as well as FIGS. 6-15 discussed further below) has four outlets 221, 222, 223, 224 (outlet 224 may be seen in FIGS. 8 and 13) that may be blocked to control fluid flow of four air cycle machines. Air enters the isolation valve through a first inlet 211 and/or a second inlet 212 from the condenser heat exchanger. For simplifications purposes, the isolation valve 200 is divided up into a first section 200a and a second section 200b, as shown in FIG. 4. The first section 200a includes a first outlet 221 and a second outlet 222, whereas the second section 200b includes a third outlet 223 and a fourth outlet 224. The first section 200a and second section 200b include similar components and thus the isolation valve, when discussed, may refer to the first 200a and/or the second chamber 200b.

As shown in FIGS. 4 and 5. The isolation valve 200 comprises a housing 202 and an air gate 250 located within the housing 202. The housing includes an internal surface 204 located within the housing 202 and a longitudinal axis A1 down the center of the housing 202, as shown in FIG. 5. The air gate 250 is configured to move to at least one of a first position blocking flow to the first outlet 221, a neutral position blocking flow to neither the first outlet 221 nor the second outlet 222, and a second position blocking flow to the second outlet 222. In an embodiment, the internal surface 204 is round, as seen in FIG. 5 and the air gate 250 is configured to move in a circle. In an embodiment, the first position and second position are separate by about 90 degrees. In an embodiment, the housing 202 is operably connected to both a first air cycle machine 318a (see FIG. 3) through the first outlet 221 in the housing 202 and a second air cycle machine 318b (see FIG. 3) through the second outlet 222 in the housing 202.

As shown in FIG. 5, the air gate 250 further includes an outward face 252 located opposite the internal surface 204 when the air gate 250 is installed in the housing 202. The air gate 250 is configured to move to at least one of a first position blocking flow to the first outlet 221, a neutral position blocking flow to neither the first outlet 221 nor the second outlet 222, and a second position blocking flow to the second outlet 222. By moving the air gate 250 of the isolation valve 200, the flow from the condenser heat exchanger to the air cycle machines may be adjusted.

In the illustrated embodiment of FIG. 5, the air gate 250 is operably connected to an axle 208 and configured to rotate around the axle 208. The axle 208 is located on the A1 axis as seen in FIG. 5. In an embodiment, an actuator 206 is configured to selectively move the air gate 250 to at least one of the first position, the neutral position, and the second position. FIG. 5 shows the air gate 250 in the neutral position and thus neither the first outlet 221 nor the second outlet 222 is blocked and air may flow to both air cycle machines. If the air gate 250 is moved to the first position to block the first outlet 221, air will only flow through the second outlet 222 to the second air cycle machine. If the air gate 250 is moved to the second position to block the second outlet 222, air will only flow through the first outlet 221 to the first air cycle machine. Advantageously, to prevent air leakage around the air gate 250, a seal 400, 500 (See FIGS. 6-15) may be utilized and interposed between the outward face 252 of the air gate 250 and the internal surface 204 of the housing.

Figure 6:
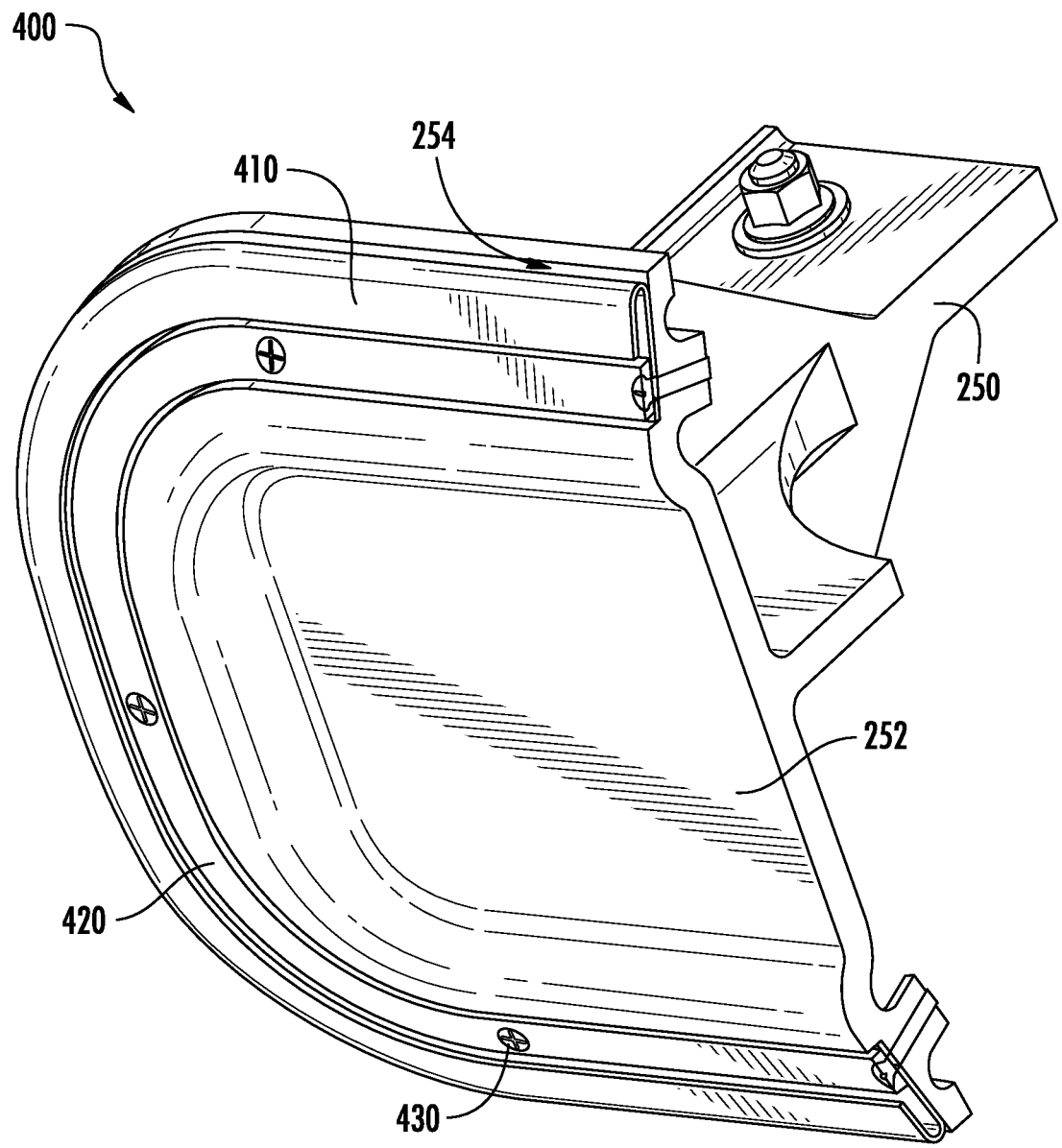
FIG. 6 is a schematic, perspective illustration of a seal assembly on an air gate within an isolation valve, according to an embodiment of the present disclosure.

Referring now to FIGS. 6-10, a seal assembly 400 for use in an isolation valve 200 is schematically illustrated, according to an embodiment of the present disclosure. The seal assembly 400 is composed of a seal 410, a retainer 420, and a fastening mechanism 430. A seal groove 254 is located on the outward face 252 of the air gate 250. In an embodiment, the seal groove 254 may have a rounded rectangular shape. The seal 410 has a shape similar to the shape of the seal groove 254 to allow the seal 410 to fit within the seal groove 254, thus in an embodiment, the seal 410 may also have a rounded rectangular shape. As seen in FIG. 6, the seal 410 is located in the seal groove 254. The seal groove 254 illustrated in FIGS. 6-10 is an outbound seal groove meaning that the seal groove 254 has only one groove wall radially inward from the seal and no groove wall radially outward from the seal 254. The radial inward groove wall is referred to as a first groove wall 254a.

Figure 7:
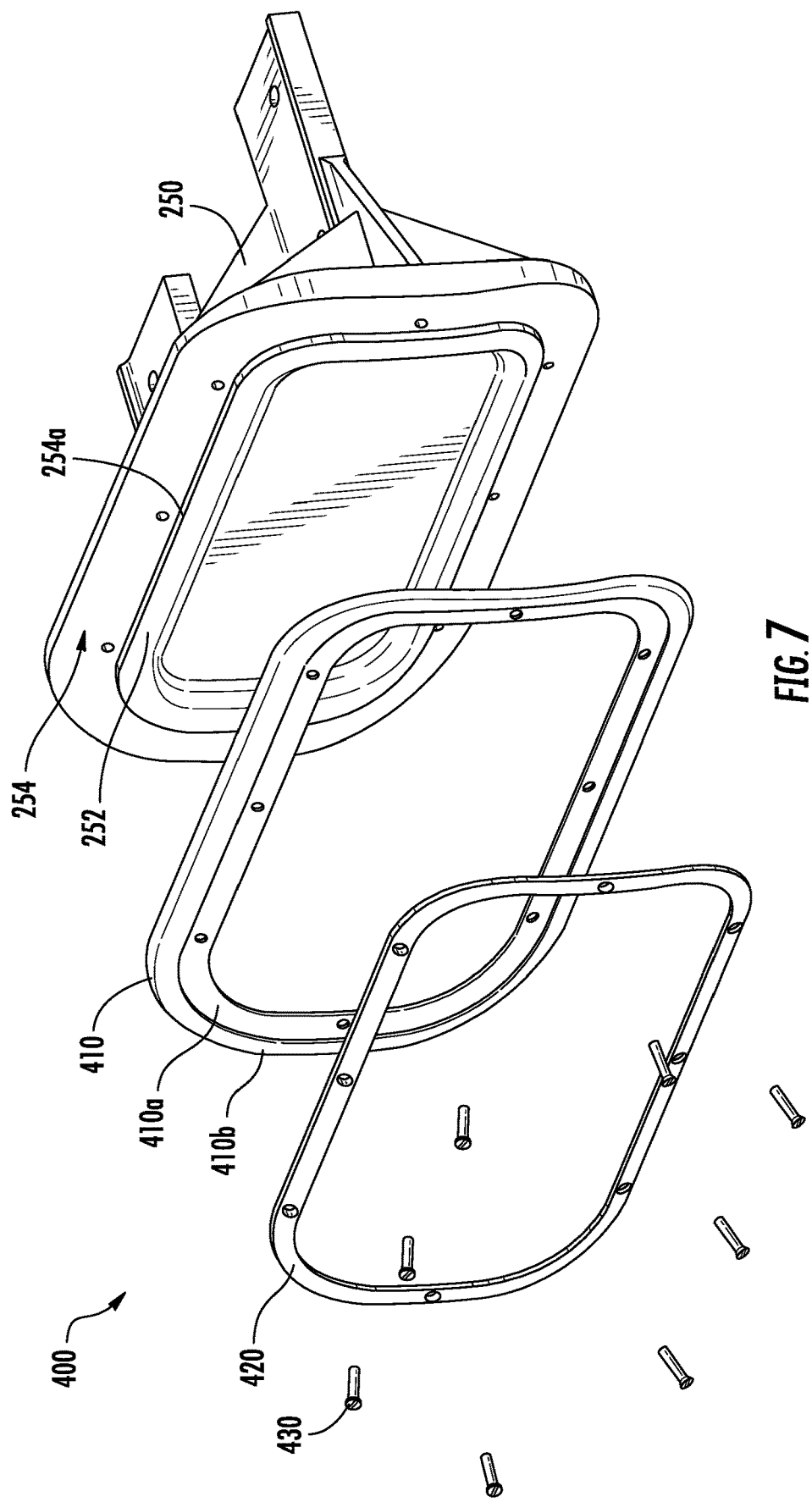
FIG. 7 is an exploded view of the seal assembly and air gate of FIG. 6, according to an embodiment of the present disclosure.

The retainer 420 is configured to secure the seal 410 within the seal groove using a fastening mechanism 430. As may be seen in FIGS. 6-10, in an embodiment, the fastening mechanism 430 may further comprise a plurality of screws to secure the retainer 420 to the air gate 250. As seen in FIGS. 6-7, the seal 410 is interposed between the retainer 420 and the outward face 252 of the air gate 250. The seal 410 may also include an inset portion 410a configure to receive the retainer. The inset portion 410a will allow the sealing portion 410b of the seal 410 to touch the internal surface 204 while leaving enough clearance for the retainer 420 to not touch the internal surface 204, as seen in FIG. 9.

Figure 8:
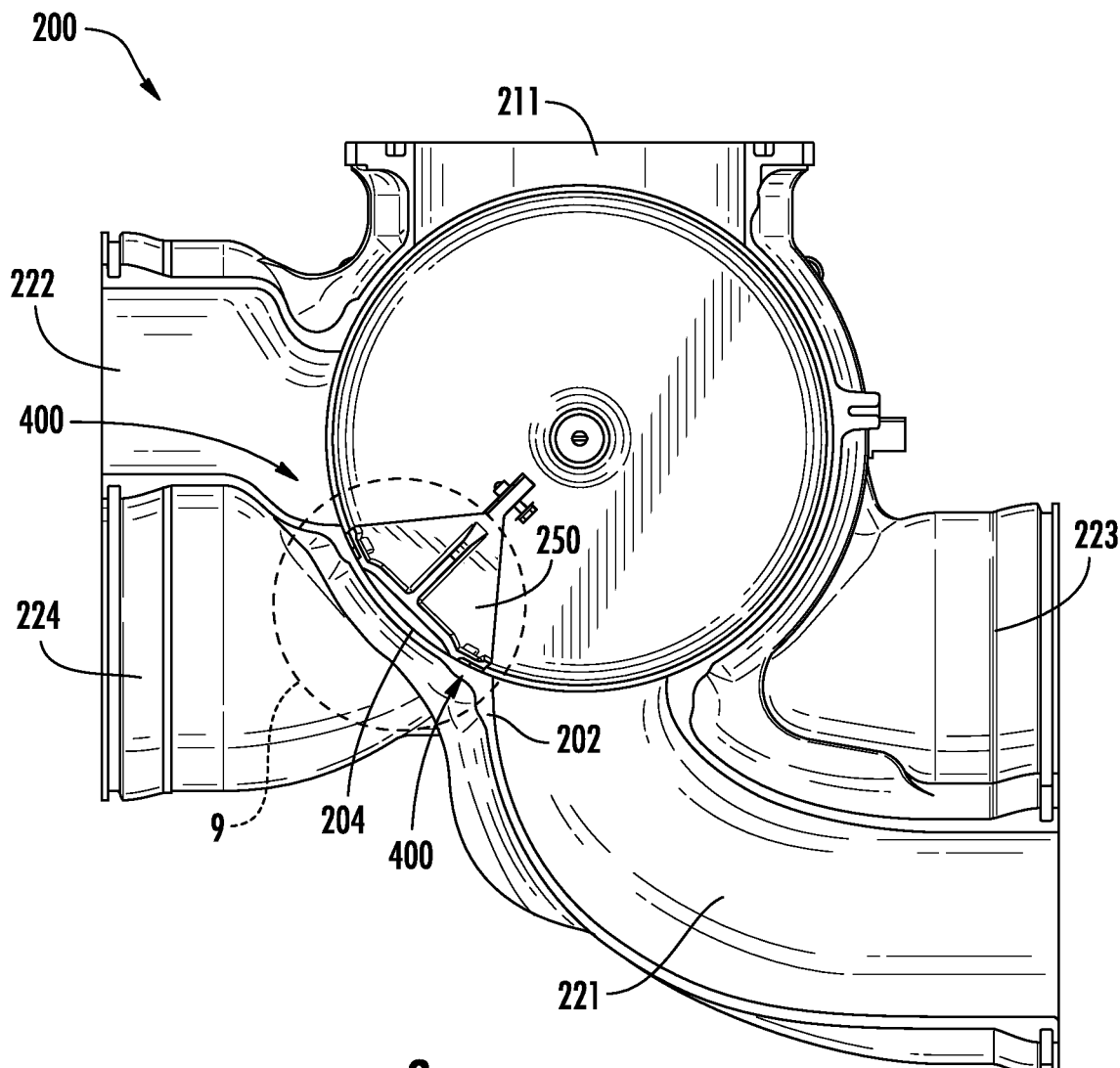
FIG. 8 is a schematic, cross-sectional illustration of an isolation valve incorporating the seal assembly and air gate of FIG. 6, according to an embodiment of the present disclosure.
Figure 9:
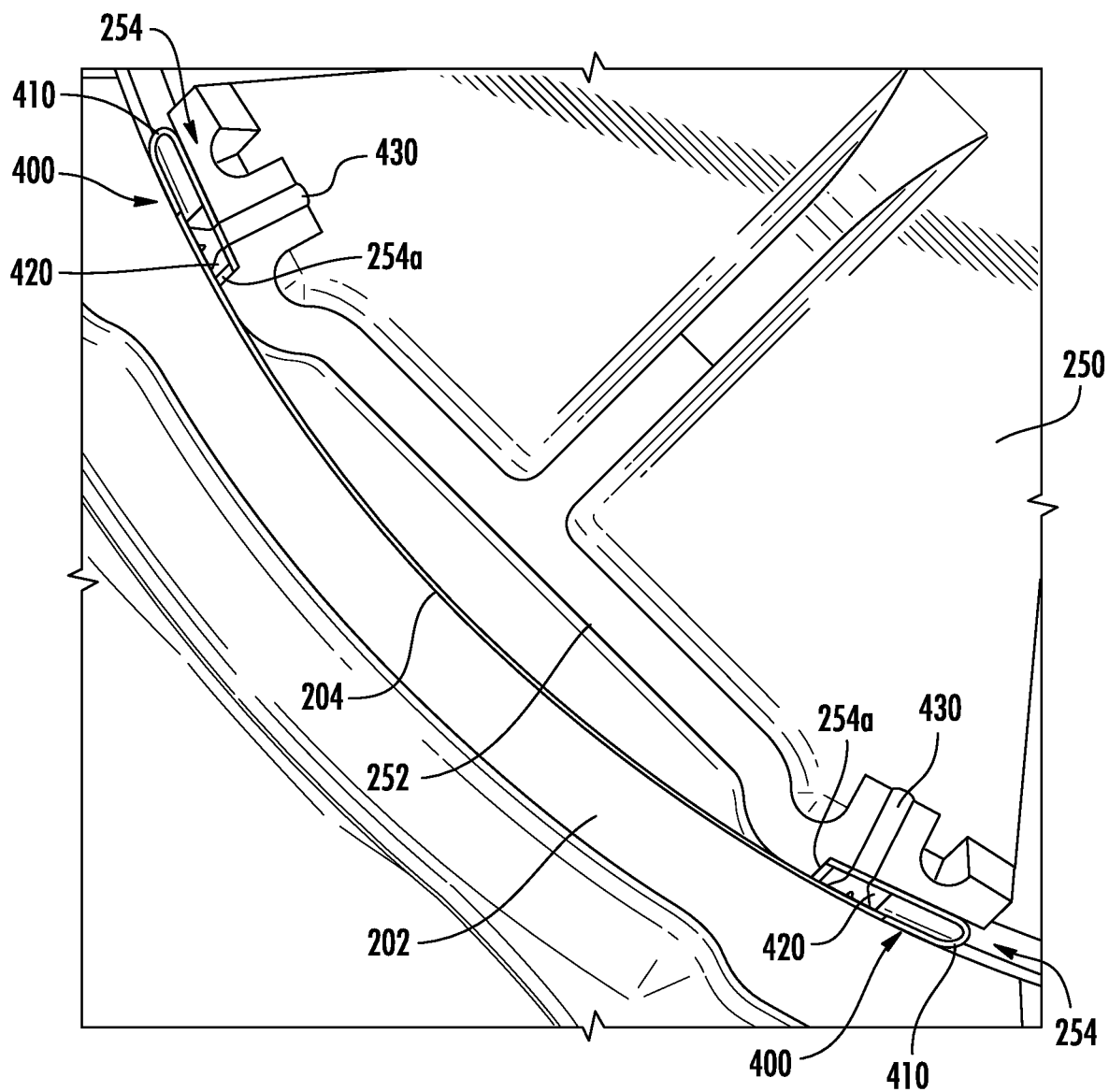
FIG. 9 is an enlarged view of FIG. 8, according to an embodiment of the present disclosure.

FIG. 8 shows the air gate 250 in the neutral position having the seal assembly 400. In the illustrated embodiment, the neutral position is located circumferentially in between the first outlet 221 and the second outlet 222. FIG. 8 shows the seal assembly 400 in association with the first chamber 200a, but as may be appreciated by one of skill in the art, the seal assembly 400 may also be used in the second chamber 200b to block flow to the third outlet 223 and/or the fourth outlet 224. An enlarged view of the air gate 250 with the seal assembly 400 in the neutral position is shown in FIG. 9. As seen in FIG. 9, the outward face 252 of the air gate 250 and the seal 410 are opposite the internal surface 204 of the housing 202. In an embodiment, there is enough clearance between the outward face 252 and the internal surface 204, such that the outward face 252 does not physically contact the internal surface 204, as seen in FIG. 9. In an embodiment, there is enough clearance between the retainer 420 and the internal surface 204, such that the retainer 420 does not physically contact the internal surface 204, as seen in FIG. 9. In an embodiment, the seal 410 does contact the internal surface 204 and is configured to slide along the internal surface 204 when the air gate 250 is moved.

FIG. 10 shows the air gate 250 in the first position blocking the flow of air through the first outlet 221. As discussed above, by blocking the flow of air through the first outlet 221 the isolation valve 200 is preventing air from reaching the first air cycle machine. As seen in FIG. 10, the seal 410 is configured to form a sealed connection with the internal surface 204 around the first outlet 221. Although not pictured, the seal 410 is also configured to form a sealed connection with the internal surface 204 around the second outlet 222 when at the second position. Without the seal 410 the isolation valve 200 may be prone to leakage around the air gate 250 and through an outlet 221, 222 when either in the first or second position. The seal 410 is configured to conform to a shape of the internal surface 204 and apply sealing pressure to the internal surface 204 to form a sealed connection with the internal surface 204. In an embodiment, the seal 410 may be composed of a low friction (metallic or non-metallic) material configured to slide against the internal surface while being compliant to apply to sealing pressure such as, for example spring steel, Teflon™, or rubber.

Referring now to FIGS. 11-15, a seal assembly 500 for use in an isolation valve 200 is schematically illustrated, according to an embodiment of the present disclosure. The seal assembly 500 is composed of a seal 510, a retainer 520, a biasing mechanism 512, and a fastening mechanism 530. As seen in FIG. 11-15, the biasing mechanism is interposed between the seal 510 and the outward face 252 within the seal groove 256. The seal groove 256 is located on the outward face 252 of the air gate 250. In an embodiment, the seal groove 256 may have a rounded rectangular shape. The seal 510 has a shape similar to the shape of the seal groove 256 to allow the seal 510 to fit within the seal groove 256, thus in an embodiment, the seal 510 may also have a rounded rectangular shape. As seen in FIG. 11, the seal 510 is located in the seal groove 256. The seal groove 256 illustrated in FIGS. 11-15 is an inbound seal groove meaning that the seal groove 256 has two groove walls include a first groove wall 256a radially inward from the seal 510 and a second groove wall 256b radially outward from the seal 510.

The retainer 520 is configured to secure the seal 510 within the seal groove using a fastening mechanism 530. As may be seen in FIGS. 11-15, in an embodiment, the fastening mechanism 530 may further comprise a plurality of screws to secure the retainer 520 to the air gate 250. As seen in FIGS. 11-15, the seal 510 is interposed between the retainer 520 and the outward face 252 of the air gate 250. As shown, the fastening mechanism 430 secures the retainer 520 to the outward face 252 of the air gate 250 and then the retainer secures the seal 510 in the seal groove 256 via a seal lip 510a. There is a gap G1 between the second groove wall 256b and the retainer 520 that allows a sealing surface 510b of the seal 510 to move in and out of the seal groove 256 in response to the balance of forces between the biasing mechanism 512, the internal surface 204, and the seal 510.

Figure 13:
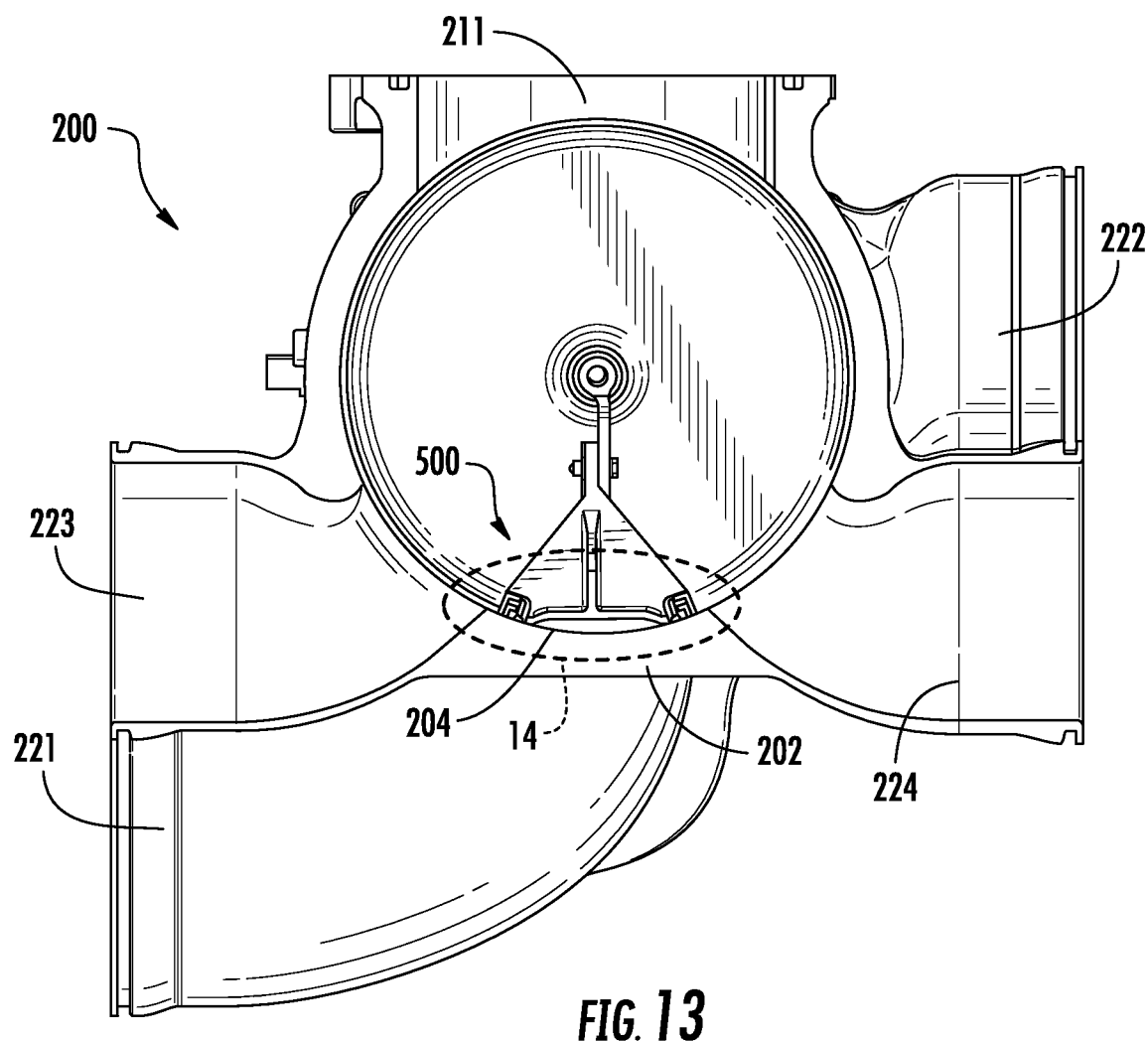
FIG. 13 is a schematic, cross-sectional illustration of an isolation valve incorporating the seal assembly and air gate of FIG. 11, according to an embodiment of the present disclosure.

FIG. 13 shows the air gate 250 in the neutral position having the seal assembly 500. In the illustrated embodiment, the neutral position is located circumferentially in between the third outlet 223 and the fourth outlet 224. FIG. 13 shows the seal assembly 500 in association with the second chamber 200b, but as may be appreciated by one of skill in the art, the seal assembly 500 may also be used in the first chamber 200a to block flow to the first outlet 221 and/or the second outlet 222. An enlarged view of the air gate 250 with the seal assembly 500 in the neutral position is shown in FIG. 14. As seen in FIG. 14, the outward face 252 of the air gate 250 and the seal 510 are opposite the internal surface 204 of the housing 202. In an embodiment, there is enough clearance between the outward face 252 and the internal surface 204, such that the outward face 252 does not physically contact the internal surface 204, as seen in FIG. 14. In an embodiment, there is enough clearance between the retainer 520 and the internal surface 204, such that the retainer 520 does not physically contact the internal surface 204, as seen in FIG. 14. In an embodiment, the seal 510 does contact the internal surface 204 and is configured to slide along the internal surface 204 when the air gate 250 is moved. The biasing mechanism 512 is configured to apply a force to the seal 510 that allows the seal 510 to contact the internal surface 204. In an embodiment, the biasing mechanism 512 may allow the seal 510 to retract radially inward by a selected increment to allow the seal 510 to slide against the internal surface 204 with less friction.

FIG. 15 shows the air gate 250 in the second position blocking the flow of air through the fourth outlet 224. As discussed above, by blocking the flow of air through the fourth outlet 224 the isolation valve 200 is preventing air from reaching the second air cycle machine. As seen in FIG. 15, the seal 510 is configured to form a sealed connection with the internal surface 204 around the second outlet 222. Although not pictured, the seal 510 is also configured to form a sealed connection with the internal surface 204 around the third outlet 223 when moved to the first position. Without the seal 510 the isolation valve 200 may be prone to leakage around the air gate 250 and through an outlet 223, 224 when either in the first or second position. The biasing mechanism 512 is configured to apply a force to the seal 510 that allows the seal 510 to conform to a shape of the housing inner surface 204 and apply a sealing pressure to the housing inner surface 204 to form the sealed connection with the internal surface 204. In an embodiment, the seal 510 may be composed of a low friction (metallic or non-metallic) material configured to slide against the internal surface while being compliant to apply to sealing pressure such as, for example, spring steel, Vespel®, rulon, or rubber.

Referring now to FIG. 16, with continued reference to FIGS. 3-15, FIG. 16 shows a flow process illustrating a method 600 of assembling the isolation valve 200 of FIGS. 3-15, according to an embodiment of the present disclosure. At block 604, an air gate 250 having an outward face 252 and a seal groove 254, 256 located on the outward face 252 is obtained. At block 606, a seal 410, 510 is inserted into the seal groove 254, 256. At block 608, the seal 410, 510 is secured within the seal groove 254, 256 using a retainer 420, 520 and a fastening mechanism 430, 530. At block 610, the air gate 250 is installed into a housing 202. The housing 202 having an internal surface 204 within the housing 202, a first outlet 221 in the internal surface 204 and a second outlet 222 in the internal surface 204. As mentioned above, the outward face 252 is opposite the internal surface 204. The air gate 250 is configured to move to at least one of a first position blocking flow to the first outlet 221, a neutral position blocking flow to neither the first outlet 221 nor the second outlet 222, and a second position blocking flow to the second outlet 222. The seal 410, 510 is configured to form a sealed connection with the internal surface 204 around at least one of the first outlet 221 when in the first position and the second outlet 222 when in the second position. The method 600 may also include: operably connecting an actuator 206 to the air gate 250. The actuator 206 is configured to selectively move the air gate 250 to at least one of the first position, the neutral position, and the second position. The method 600 may further include: inserting a biasing device 512 interposed between the seal 510 and the seal groove 256. As discussed above, the biasing device 512 is configured to apply a force to the seal 510 that allows the seal 510 to conform to a shape of the housing internal surface 204 and apply a sealing pressure to the housing internal surface 204 to form the sealed connection with the internal surface 204. As may be appreciated by one of skill in the art, the method 600 is also applicable to an air gate seal 250 located in the second chamber 200b and the air gate seal 250 along with a seal assembly 400, 500 may be used to block flow to the third outlet 223 and/or the fourth outlet 224.

While the above description has described the flow process of FIG. 16 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An isolation valve comprising:
   a housing having an internal surface within the housing, the internal surface having a first outlet and a second outlet;
   an air gate having an outward face opposite the internal surface, the air gate being located within the housing and configured to move to at least one of a first position blocking airflow to the first outlet, a neutral position blocking air flow to neither the first outlet nor the second outlet, and a second position blocking airflow to the second outlet;
   a seal groove located on the outward face of the air gate;
   a seal located within the seal groove, the seal being configured to form a sealed connection with the internal surface around at least one of the first outlet when in the first position and the second outlet when in the second position, wherein the seal groove is an inbound groove including a first groove wall radially inward from the seal and a second groove wall radially outward from the seal;

a retainer configured to secure the seal within the seal groove using a fastening mechanism, the retainer securing the seal in the seal groove via a seal lip; and a biasing device located within the seal groove, the biasing mechanism being configured to apply a force to the seal that allows the seal to conform to a shape of the housing internal surface and apply a sealing pressure to the housing internal surface to form the sealed connection with the internal surface, wherein a gap exists between the second groove wall and the retainer, the gap being configured to allow a sealing surface of the seal to move in and out of the seal groove in response to a balance of forces between the biasing mechanism, the internal surface, and the seal.

2. The isolation valve of claim 1, further comprising:

an actuator configured to selectively move the air gate to at least one of the first position, the neutral position, and the second position.

3. The isolation valve of claim 1, wherein:

the seal is configured to conform to the shape of the housing internal surface and apply sealing pressure to the housing internal surface to form the sealed connection with the internal surface.

4. The isolation valve of claim 1, wherein:

the seal is configured to slide along the internal surface when the air gate is moved.

5. The isolation valve of claim 1, wherein the fastening mechanism further comprises:

a plurality of screws securing the retainer to the air gate, wherein the seal is interposed between the retainer and the outward face of the air gate.

6. A method of assembling an isolation valve, the isolation valve comprising:

obtaining an air gate having an outward face and a seal groove located on the outward face;

inserting a seal within the seal groove, wherein the seal groove is an inbound groove including a first groove wall radially inward from the seal and a second groove wall radially outward from the seal;

securing the seal within the seal groove using a retainer and a fastening mechanism, the retainer securing the seal in the seal groove via a seal lip;

installing the air gate into a housing, the housing having an internal surface within the housing, a first outlet in the internal surface and a second outlet in the internal surface; and inserting a biasing device interposed between the seal and the seal groove, the biasing device being configured to apply a force to the seal that allows the seal to conform to a shape of the housing internal surface and apply a sealing pressure to the housing internal surface to form the sealed connection with the internal surface, wherein the outward face being opposite the internal surface, wherein the air gate is configured to move to at least one of a first position blocking flow to the first outlet, a neutral position blocking flow to neither the first outlet nor the second outlet, and a second position blocking flow to the second outlet, wherein the seal is configured to form a sealed connection with the internal surface around at least one of the first outlet when in the first position and the second outlet when in the second position, and wherein a gap exists between the second groove wall and the retainer, the gap being configured to allow a sealing surface of the seal to move in and out of the seal groove in response to a balance of forces between the biasing mechanism, the internal surface, and the seal.

7. The method of claim 6, further comprising:

operably connecting an actuator to the air gate, the actuator being configured to selectively move the air gate to at least one of the first position, the neutral position, and the second position.

8. The method of claim 6, wherein:

the seal is configured to conform to the shape of the housing internal surface and apply sealing pressure to the housing internal surface to form the sealed connection with the internal surface.

\* \* \* \* \*